US012681520B2

(12) United States Patent
Banerjee et al.

(10) Patent No.: US 12,681,520 B2
(45) Date of Patent: Jul. 14, 2026

(54) POWER SUPPLY REJECTION RATIO ENHANCMENT TECHNIQUES FOR LOW DROPOUT REGULATORS

(71) Applicant: Analog Devices International Unlimited Company, Limerick (IE)

(72) Inventors: Debopam Banerjee, Bangalore (IN); Guru Kumar Vanganuru, Bangalore (IN)

(73) Assignee: Analog Devices International Unlimited Company, Limerick (IE)

( * ) Notice: Subject to any disclaimer, the term of this patent is extended or adjusted under 35 U.S.C. 154(b) by 681 days.

(21) Appl. No.: 18/165,209

(22) Filed: Feb. 6, 2023

(65) Prior Publication Data

US 2024/0264619 A1 Aug. 8, 2024

(51) Int. Cl.
*G05F 1/575* (2006.01)
*G05F 1/56* (2006.01)

(52) U.S. Cl.
CPC ................ *G05F 1/575* (2013.01); *G05F 1/56* (2013.01)

(58) Field of Classification Search
CPC ... G05F 1/10; G05F 1/46; G05F 1/461; G05F 1/462; G05F 1/468; G05F 1/56; G05F 1/561; G05F 1/562; G05F 1/563; G05F 1/565; G05F 1/571; G05F 1/573; G05F 1/575; G05F 1/59; G05F 3/26; G05F 3/262; G05F 3/30
See application file for complete search history.

(56) References Cited

U.S. PATENT DOCUMENTS

| | | | | |
|---|---|---|---|---|
| 2012/0146595 A1* | 6/2012 | Wong | G05F 1/56 | 323/265 |
| 2014/0355161 A1* | 12/2014 | Torres | H02H 9/02 | 361/93.9 |
| 2016/0195883 A1* | 7/2016 | Aboudina | G05F 1/575 | 323/280 |
| 2020/0122126 A1* | 4/2020 | Suh | B01J 21/04 | |
| 2023/0055611 A1* | 2/2023 | Joshi | G05F 1/56 | |
| 2023/0188147 A1* | 6/2023 | Choi | H03M 1/08 | 341/118 |
| 2023/0393601 A1* | 12/2023 | Roh | G05F 1/565 | |

FOREIGN PATENT DOCUMENTS

KR 20200012434 A * 2/2020 ............... G05F 1/56

OTHER PUBLICATIONS

Duong, Quoc-Hoang, et al., "Multiple-Loop Design Technique for High-Performance Low-Dropout Regulator", IEEE JSSC, vol. 52, No. 10, (2016), 217-220.

(Continued)

*Primary Examiner* — Thienvu V Tran
*Assistant Examiner* — Shahzeb K Ahmad
(74) *Attorney, Agent, or Firm* — Schwegman Lundberg & Woessner, P.A.

(57) ABSTRACT

Techniques are described to improve the high frequency PSRR in LDOs, such as LDOs providing load currents in excess of 120 mA and about a 200 millivolt (mV) dropout. In addition, techniques are described to current limit the LDO and improve the stability of load current dependent pole-zero placement.

11 Claims, 7 Drawing Sheets

(56) References Cited

OTHER PUBLICATIONS

Esteves, Jorge, et al., "Ultra low power capless LDO with dynamic biasing of derivative feedback", Microelectronics Journal vol. 44, (Feb. 2013), 94-102.
Hammer, Andreas, et al., "Sub-1 V Output-Capacitor-Less Low-Dropout Regulator with Two Compensation Amplifiers for Enhanced Power Supply Rejection", IEEE ICAS, (2020), 5 pgs.
Ming, Xin, et al., "A Fast-Transient Low-Dropout Regulator with Two Compensation Amplifiers for Enhanced Power Supply Rejection", IEEE TCAS-I, vol. 68, No. 6, (Jun. 2021), 2354-2367.
Yang, Chao, et al., "A 0.5-V Capless LDO With 30-dB PSRR at 10-kHz Using a Lightweight Local Generated Supply", IEEE TCAS-II, vol. 67, No. 10, (Oct. 2020), 1785-1789.
Yun, Seong Jin, et al., "Capless LDO Regulator Achieving—76 dB PSR and 96.3 fs FOM", IEEE TCAS-II, vol. 64, No. 10, (Oct. 2017), 1147-1151.
Zhang, Yu, et al., "A fully integrated overshoot-reduction low-dropout regulator based on hybrid NMOS/PMOS power transistors technique for SoC applications", Microelectronics Journal vol. 125, 105471, (Jul. 2022), 9 pgs.

* cited by examiner

POWER SUPPLY REJECTION RATIO ENHANCMENT TECHNIQUES FOR LOW DROPOUT REGULATORS

FIELD OF THE DISCLOSURE

This document pertains generally, but not by way of limitation, to low dropout voltage regulators (LDOs).

BACKGROUND

Low dropout voltage regulators (LDOs) are voltage regulators that can operate with a small input-output differential voltage while maintaining a substantially constant output voltage. One performance measure of LDOs is power supply rejection ratio (PSRR), which measures how well an LDO rejects noise contained in the input voltage. Higher PSRR means that the output voltage is less sensitive to the noise component contained in the input voltage and is thus more desirable.

SUMMARY OF THE DISCLOSURE

This disclosure describes techniques to improve the high frequency PSRR in LDOs, such as LDOs providing load currents in excess of 120 mA and about a 200 millivolt (mV) dropout. In addition, this disclosure describes techniques to current limit the LDO and improve the stability of load current dependent pole-zero placement.

In some aspects, this disclosure is directed to a low dropout voltage regulator (LDO) with power supply noise compensation, the LDO comprising: a first transistor coupled between a voltage supply and an output node, the first transistor having a control terminal; a first feedback network coupled to the output node and configured to generate an error voltage based on a regulated output voltage of the LDO; a first amplifier circuit including a first input for receiving a reference voltage and a second input for receiving the error voltage; and a power supply noise compensation circuit coupled between a voltage supply and the control terminal of the first transistor.

In some aspects, this disclosure is directed to a method of performing power supply noise compensation in a low dropout voltage regulator (LDO), the method comprising: receiving a voltage at a control terminal of a first transistor coupled between a voltage supply and an output node and generating a responsive regulated output voltage of the LDO at the output node; generating an error voltage based on the regulated output voltage of the LDO via a first feedback network coupled to the output node; and controlling the voltage at the control terminal of the first transistor by summing the error voltage and a power supply noise compensation component from a power supply noise compensation circuit.

In some aspects, this disclosure is directed to a low dropout voltage regulator (LDO) with power supply noise compensation, the LDO comprising: means for receiving a voltage at a control terminal of a first transistor coupled between a voltage supply and an output node and generating a responsive regulated output voltage of the LDO at the output node; means for generating an error voltage based on the regulated output voltage of the LDO via a first feedback network coupled to the output node; and means for controlling the voltage at the control terminal of the first transistor by summing the error voltage and a power supply noise compensation component from a power supply noise compensation circuit.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
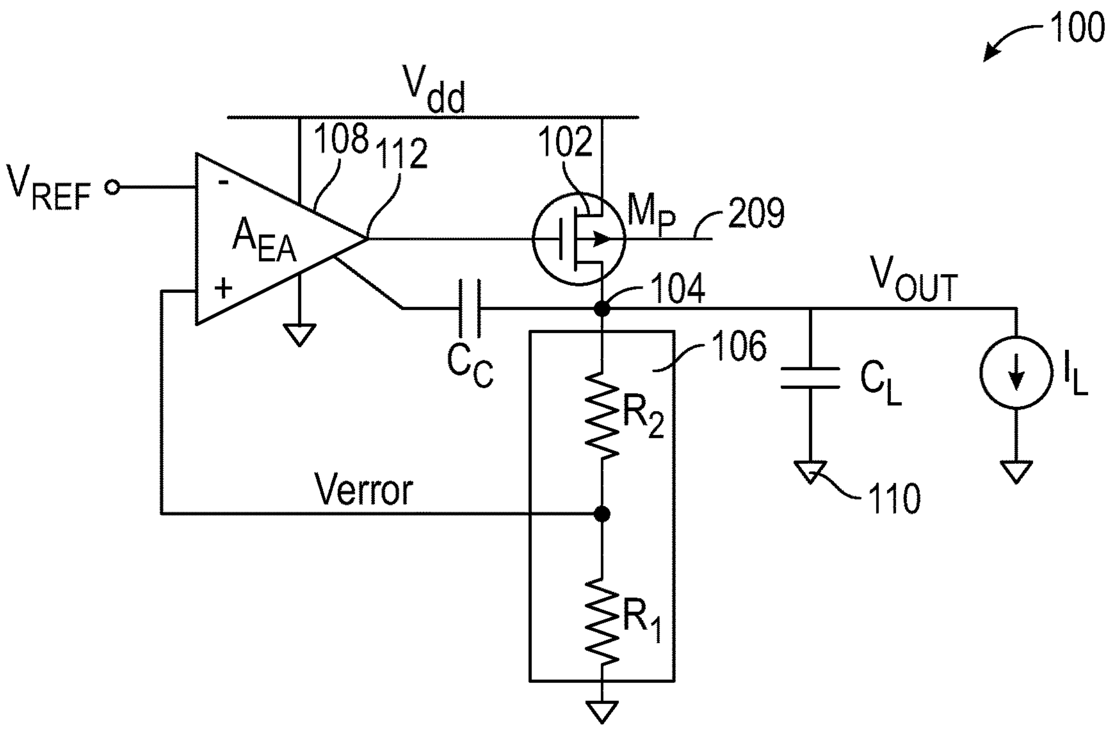
FIG. 1 is an example of an existing low dropout voltage regulator. The simplified version of a PFET-based LDO 100 is internally compensated.

The present inventors have recognized that both internal capacitor low dropout regulators (LDOs) and external capacitor LDOs, where output load current ($I_{LOAD}$) is high and dropout-voltage ($V_{DO}$) is low, utilize a large p-type field-effect transistor (FET), e.g., a PMOS device, as the main power FET, which causes a significant degradation of the mid and higher frequency power supply rejection ratio (PSRR). For some applications, the input voltage to the LDO can vary from 3 volts (V) to 3.6V while the output voltage is programmable from 1.4V to 2.85V. The $I_{LOAD}$ requirement can vary from 10 milliamps (mA) to 130 mA and is primarily intended for a RF power amplifier (PA) driving an antenna load.

During operation the PA will often be the aggressor block, which generates significant noise around 2.4 GHz onto the 3.3V supply. However, the PA might still be susceptible to the supply line ripple, which, in turn, will be driven by a dc-dc buck converter running at frequencies from 200 kilohertz (kHz) to 2.2 megahertz (MHz). This means that the LDO supplying regulated voltage to the PA supply port must also have adequate PSRR in these frequency ranges. The value of the output capacitor, which determines the output ripple on the regulated supply to PA, is not in the hands of the LDO designer. Further, the control loop involving the error amplifier stages and the PFET stage would typically have a low unity gain bandwidth (UGB) to ensure stability in all load current and load cap conditions.

This disclosure describes techniques to improve the high frequency PSRR in LDOs, such as LDOs providing load currents in excess of 120 mA and about a 200 millivolt (mV) dropout. In addition, this disclosure describes techniques to current limit the LDO and improve the stability of load current dependent pole-zero placement.

FIG. 1 is an example of an existing low dropout voltage regulator. The simplified version of a PFET-based LDO 100 shown in FIG. 1 is internally compensated. The compensation scheme and error amplifier stages are not explicitly shown for the sake of brevity. The LDO 100 includes an output transistor 102, e.g., a power FET, coupled between a voltage supply $V_{DD}$ and an output node 104 at which a regulated output voltage $V_{OUT}$ is generated.

The LDO 100 includes a feedback network 106 coupled to the output node 104 and configured to generate an error voltage $V_{ERROR}$ based on the regulated output voltage $V_{OUT}$ of the LDO 100. In FIG. 1, the feedback network 106 includes resistive elements R1 and R2, which are connected in series with one another.

The LDO 100 further includes an error amplifier 108 with gain $A_{EA}$ and having a first input, e.g., inverting terminal, for receiving a reference voltage $V_{REF}$ and a second input, e.g., non-inverting terminal, for receiving the error voltage $V_{ERROR}$. The output 112 of the error amplifier 108 is coupled to a control terminal 204 of the output transistor 102, such as a gate terminal.

An output load capacitor CL is coupled between the output node 104 and a reference node 110, such as ground. Another capacitor Cc is coupled between the output node 104 and the error amplifier 108. The load current is represented as a current source $I_L$.

Figure 2:
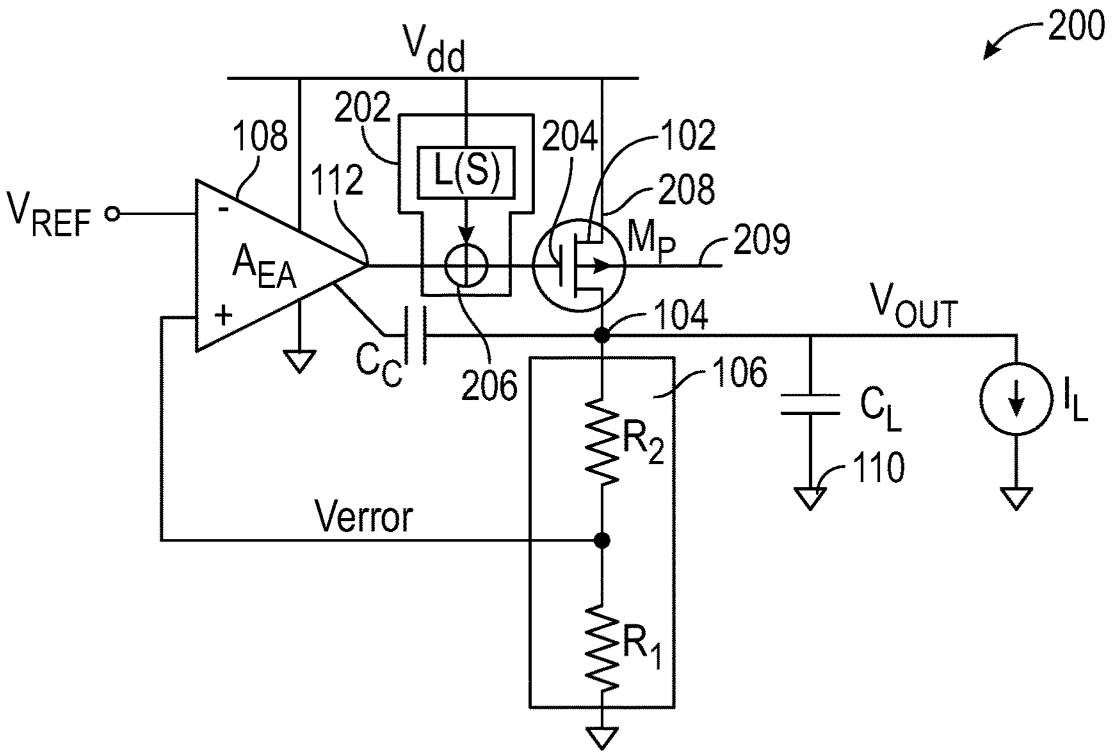
FIG. 2 is an example of a low dropout voltage regulator with power supply noise compensation, in accordance with this disclosure.

FIG. 2 is an example of a low dropout voltage regulator with power supply noise compensation, in accordance with this disclosure. Some of the components of the LDO 200 in FIG. 2 are similar to components of the LDO 100 in FIG. 1. As such, similar reference numbers are used and, for conciseness, similar elements will not be described in detail again.

Using the techniques of this disclosure, the LDO 200 includes a power supply noise compensation circuit 202 coupled between the voltage supply $V_{DD}$ and the control terminal 204 of the output transistor 102. The output transistor 102 includes a first terminal 208, e.g., source terminal, a second terminal 209, e.g., bulk terminal, and a third terminal, e.g., drain terminal.

In a typical circuit, the PSRR can be represented by Equation (1) below:

$$\frac{v_o(s)}{v_{dd}(s)} = \frac{g_{mp}\left(r_{op}//\frac{1}{sC_{db}}//Z_{out}(s)\right)}{\beta g_{mp}\left(r_{op}//\frac{1}{sC_{db}}//Z_{out}(s)\right)A_{ea}(s)-1} \tag{1}$$

The use of Equation (1) assumes that the main contributor to the final output PSRR is through the transconductance $g_m$ and on resistance $r_o$ of the pass device (the output transistor 102) and the secondary path through finite power supply rejection (PSR) of the error amplifier is adequate at the frequencies of interest. Equation (1) accounts for the whole output network, including any bond wire inductances, and the equivalent series resistance (ESR) and equivalent series inductance (ESL) of the external capacitor CL. Any pole-zero compensation in the feedback network is being lumped into a single impedance $Z_{out}(s)$.

Typically, if the gate of the output transistor 102 is the dominant pole then all the supply noise couples to the output, with the last power stage acting like a common-gate amplifier, which can be seen as a hump in a PSRR plot that goes above 0 dB. This can be undesirable because it means any supply noise in and around the frequencies of interest is magnified at the PA output transmitted through the antenna. If the LDO has a huge capacitor at the output, and this non-dominant pole appears slightly inside the UGB, then this starts shorting the output starting from its pole frequency. While this ensures that the PSRR does not go beyond 0 dB, it comes at a cost of degraded phase-margin. The power supply noise compensation circuit 202 (the L(s) path) tries to avoid this trade-off by inserting another path that tracks the operating parameters of the main PFET and providing a cancellation to the supply noise component leaking onto the output node.

The PSRR of the LDO 200 of FIG. 2 can be represented by Equation (2) below:

$$\frac{v_o(s)}{v_{dd}(s)} = \frac{\left\{1+g_{mp}\left(r_{op}//\frac{1}{sC_{db}}\right)L(s)\right\}Z_{out}(s)}{r_{op}+\left\{\beta g_{mp}\left(r_{op}//\frac{1}{sC_{db}}\right)A_{ea}(s)-1\right\}Z_{out}(s)} \tag{2}$$

where $Z_{out}(s)$ is the output impedance involving the feedback network, load network and load capacitance.

At mid-frequencies, Equation 2 can be approximated by Equation (3) below:

$$\frac{v_o(s)}{v_{dd}(s)} = \frac{1+g_{mp}\left(r_{op}//\frac{1}{sC_{db}}\right)L(s)}{\beta g_{mp}\left(r_{op}//\frac{1}{sC_{db}}\right)A_{ea}(s)-1} \tag{3}$$

An improvement in supply rejection within a restricted band of interest can be achieved by emulating the transfer function L(s) shown in Equation (4) by using the power supply noise compensation circuit 202 of FIG. 2:

$$L(s) = \frac{-1}{g_{mp}\left(r_{op}//\frac{1}{sC_{db}}\right)} \tag{4}$$

Figure 3:
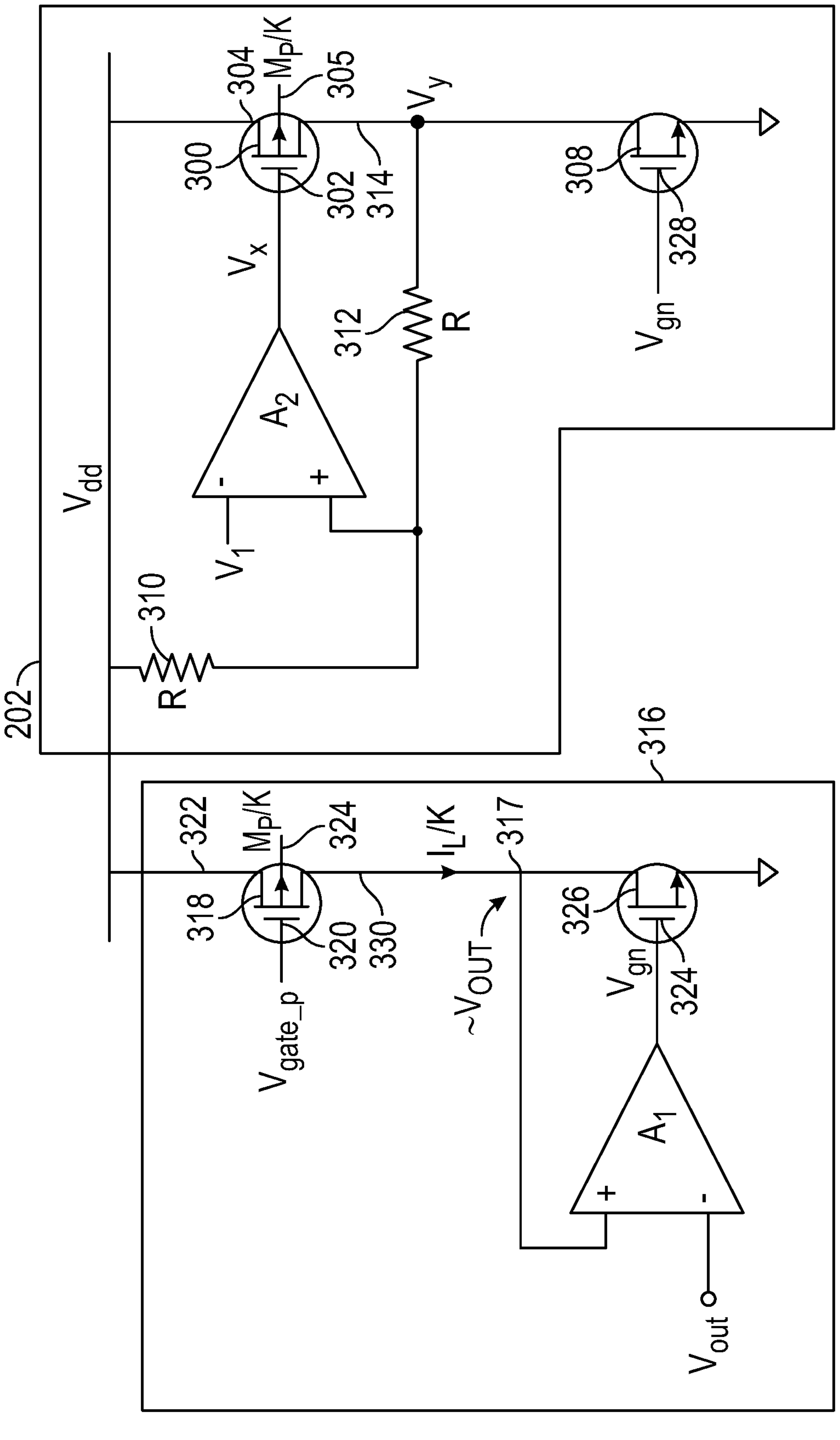
FIG. 3 depicts an example of the power supply noise compensation circuit of FIG. 2, in accordance with this disclosure.

FIG. 3 depicts an example of the power supply noise compensation circuit of FIG. 2, in accordance with this disclosure. The power supply noise compensation circuit 202 includes a transistor 300, e.g., PFET, that is a scaled replica (Mp/k) of the output transistor 102 of FIG. 2. Respective voltages at a control terminal 302, e.g., gate terminal, a first terminal 304, e.g., source terminal, and a second terminal 306, e.g., bulk terminal 305, of the transistor 300 correspond to voltages of the control terminal, e.g., gate terminal, a first terminal, e.g., source terminal, and a second terminal, e.g., bulk terminal of the output transistor 102 of FIG. 2, respectively. The power supply noise compensation circuit 202 includes a transistor 308 coupled in series with the transistor 300 to bias the transistor 300 with a scaled current through the transistor 102 of FIG. 2.

The power supply noise compensation circuit 202 further includes an amplifier circuit A2 configured to include a feedback network that includes the transistor 300 as well as a resistor 310 and a resistor 312. In some examples, the amplifier circuit A2 is a folded-cascode configuration.

Figure 4:
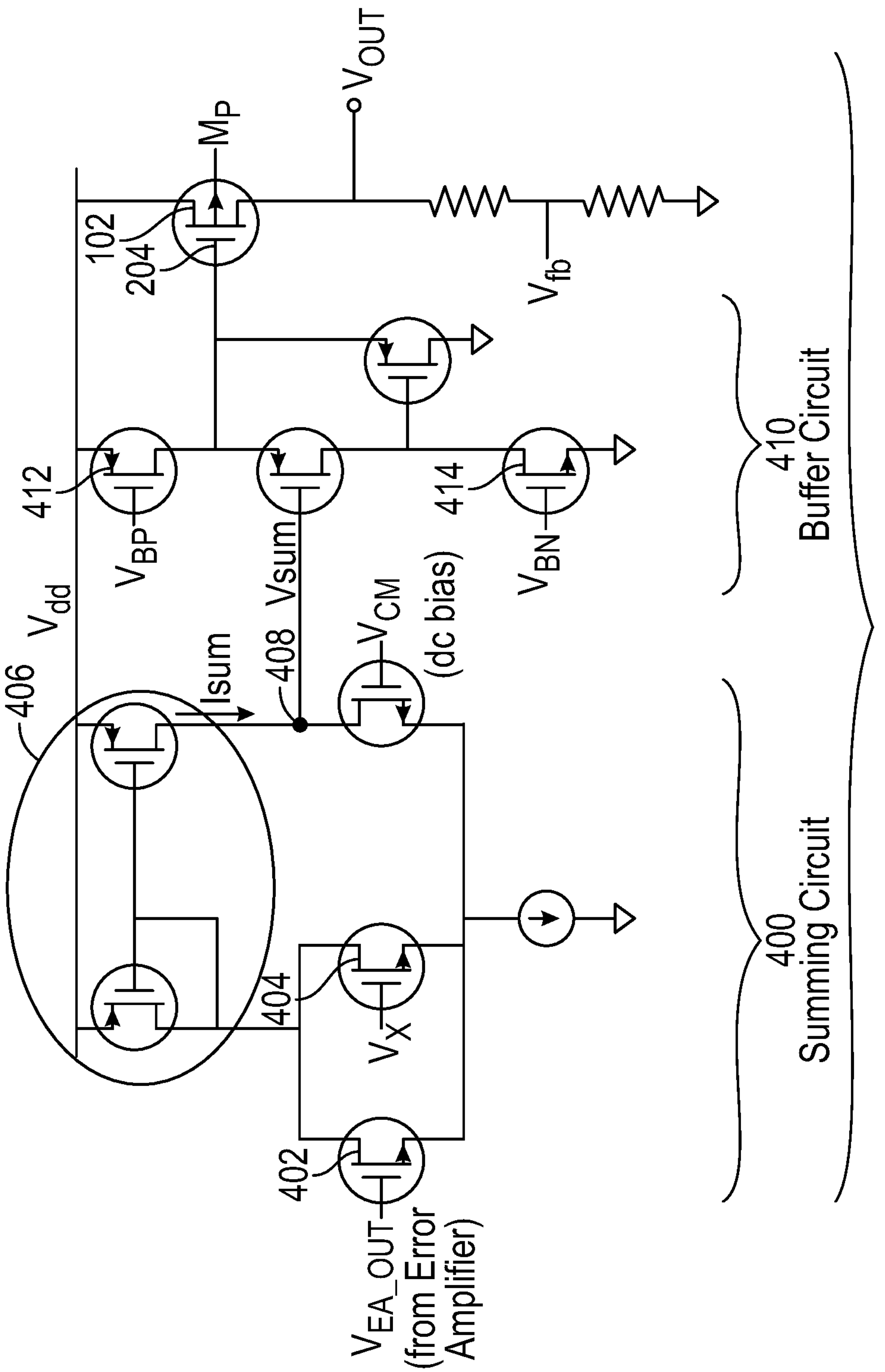
FIG. 4 depicts an example of the power supply noise compensation circuit output added with the output of the error amplifier to drive the control terminal of the output transistor, in accordance with this disclosure.

The feedback network generates a power supply noise offset voltage Vy, e.g., an AC voltage, at a third terminal 314, e.g., drain terminal, of the transistor 300 and a corresponding control terminal voltage Vx at the control terminal 302 of the transistor 300. Referring back to FIG. 2, the power supply noise compensation circuit 202 further includes a summing circuit 206, which is shown in more detail in FIG. 4. The summing circuit 206 sums an output voltage of the error amplifier 108 with the control terminal voltage Vx (at the control terminal 302 of the transistor 300) for application to the control terminal 204 of the transistor 102 of FIG. 2 for power supply noise compensation of the regulated output voltage. The generated voltage Vx is added to the output of the error amplifier 108 of FIG. 2 and drives the control terminal of the output transistor 102 of FIG. 2, such as using a buffer circuit as shown in FIG. 4.

Referring back to FIG. 3, the power supply noise compensation circuit 202 is an amplifier feedback arrangement that emulates the transfer function L(s) described previously. The voltage Vy generated due to the feedback configuration using the resistors 310, 312 includes a dc voltage component close to the regulated output voltage $V_{OUT}$ of the LDO and a small signal component whose behavior replicates the noise profile on the supply, as shown below by Equation (5):

$$v_y|_{dc} = V_{OUT\_dc} \text{ and } v_y|_{ac} = -V_{dd\_ac} \tag{5}$$

The first part of Equation (5) is enforced because the voltages at the source and bulk terminals of the transistor 300 match those of the output transistor 102. The drain current is again fixed by the n-type FET transistor 308, whose control terminal 328 is being driven by the voltage $V_{GN}$. The voltage Vx at the control terminal 302 of the transistor 300 will be close to the voltage Vgate_p at the control terminal 320 of the transistor 318 in a dc sense. The voltage V1 at the inverting input of the amplifier circuit A2 is a dc voltage that can be nominally set to $$\frac{V_{dd} + V_{OUT}}{2}.$$

The amplifier circuit A2 desirably has a high UGB and sufficient gain, such as loop gain of ~40 dB and UGB of at least the frequencies up to which the compensation scheme is designed to work. This is because the accuracy of the PSRR compensation depends on the accurate tracking of the supply noise and adding it to the error amplifier output in proper phase. Referring again to Equation (5), the gain from $V_{DD}$ to Vy is −1. Thus, the gain from $V_{DD}$ to Vx is $$\frac{-1}{g_{mp}\left(r_{op} // \frac{1}{sC_{db}}\right)}.$$

Due to the mirroring of dc operating conditions from the output transistor 102 to this scaled replica, parameters like $g_{mp}$, $r_{op}$, $$\frac{1}{sC_{db}}$$

are similar and hence lead to the desired transfer function of L(s).

FIG. 3 further depicts an example of a biasing network 316 configured to generate the scaled current ($I_L$/k) through the output transistor 102 of FIG. 2 upon which a bias current of the transistor 300 is based. The biasing network 316 includes an amplifier circuit A1 and a transistor 318, where the transistor 318 is a scaled replica (Mp/k) of the transistor 102 of FIG. 2. Respective voltages at a control terminal 320, e.g., gate terminal, a first terminal 322, e.g., a source terminal, and a second terminal 324, e.g., bulk terminal, of the transistor 318 correspond to voltages of the control terminal 204, the first terminal 208, and the second terminal 209 of the transistor 102 of FIG. 2, respectively.

The amplifier circuit A1 generates a voltage $V_{GN}$ that is applied to a control terminal 324, e.g., gate terminal, of a transistor 326. The voltage $V_{GN}$ is also applied to a control terminal 328, e.g., gate terminal, of the transistor 308. The amplifier circuit A1 includes an inverting terminal configured to receive the regulated output voltage $V_{OUT}$ and a non-inverting terminal coupled to a node 317 between the transistor 318 and the transistor 326. The voltage at the non-inverting terminal of the amplifier circuit A1 is approximately $V_{OUT}$.

As indicated above, the gate, source and bulk terminals of the transistor 318 are at the same potential as the output transistor 102 of FIG. 2. The drain terminal 330 of the transistor 318 is forced to the same voltage via the negative feedback loop involving the amplifier circuit A1 and the n-type transistor 324 connected to the output of the amplifier circuit A1. This forces a scaled version of the actual load current ($I_L$/k) to be flowing in the second terminal 324 with the output maintained around the regulated voltage $V_{OUT}$.

In some examples, the amplifier circuit A1 is a low bandwidth, high output swing capable operational amplifier. Also, the loop gain of the amplifier circuit A1 does not need to be high because its main purpose is to create a replica of the output voltage onto the drain of the transistor 318 on the top left. As such, the amplifier circuit A1 does not need to be a high precision operational amplifier and does not add much to the area and power penalty.

It can be desirable for the resistors 310, 312 to be sufficiently high, such as hundreds of kilohms, otherwise the drain current of the transistor 300 will be reduced by $$\frac{V_{dd} + V_{OUT}}{2R}.$$

In low load current cases, it can be desirable to draw away the drain current of the transistor 300 by another current source at the drain terminal of the transistor 300 to maintain the compensation scheme's accuracy.

FIG. 4 depicts an example of the power supply noise compensation circuit output added with the output of the error amplifier to drive the control terminal of the output transistor, in accordance with this disclosure. The summing circuit 400 can include a pair of transistors 402, 404. The transistor 402, e.g., an n-type FET, is configured to receive the output voltage of the error amplifier 108 of FIG. 2 and the transistor 404 is configured to receive the control terminal voltage Vx of FIG. 3. The pair of transistors 402, 404 is configured to produce a sum of the output voltage of the error amplifier 108 and the control terminal voltage Vx. In the example shown, a current mirror 406 is coupled to the pair of transistors 402, 404 and configured to produce a current $I_{SUM}$ representing the sum based upon which a voltage Vsum representing the sum is generated at node 408.

Optionally, the summing circuit 400 includes a buffer circuit 410, such as a super source follower. The buffer circuit 410 is coupled between the summing circuit 400 and the control terminal 204 of the output transistor 102 (also shown in FIG. 2). The p-type transistor 412 and the n-type transistor 414 have their control terminals driven by voltages $V_{BP}$ and $V_{BN}$, respectively, and act as current sources that bias the buffer circuit 410.

Figure 5:
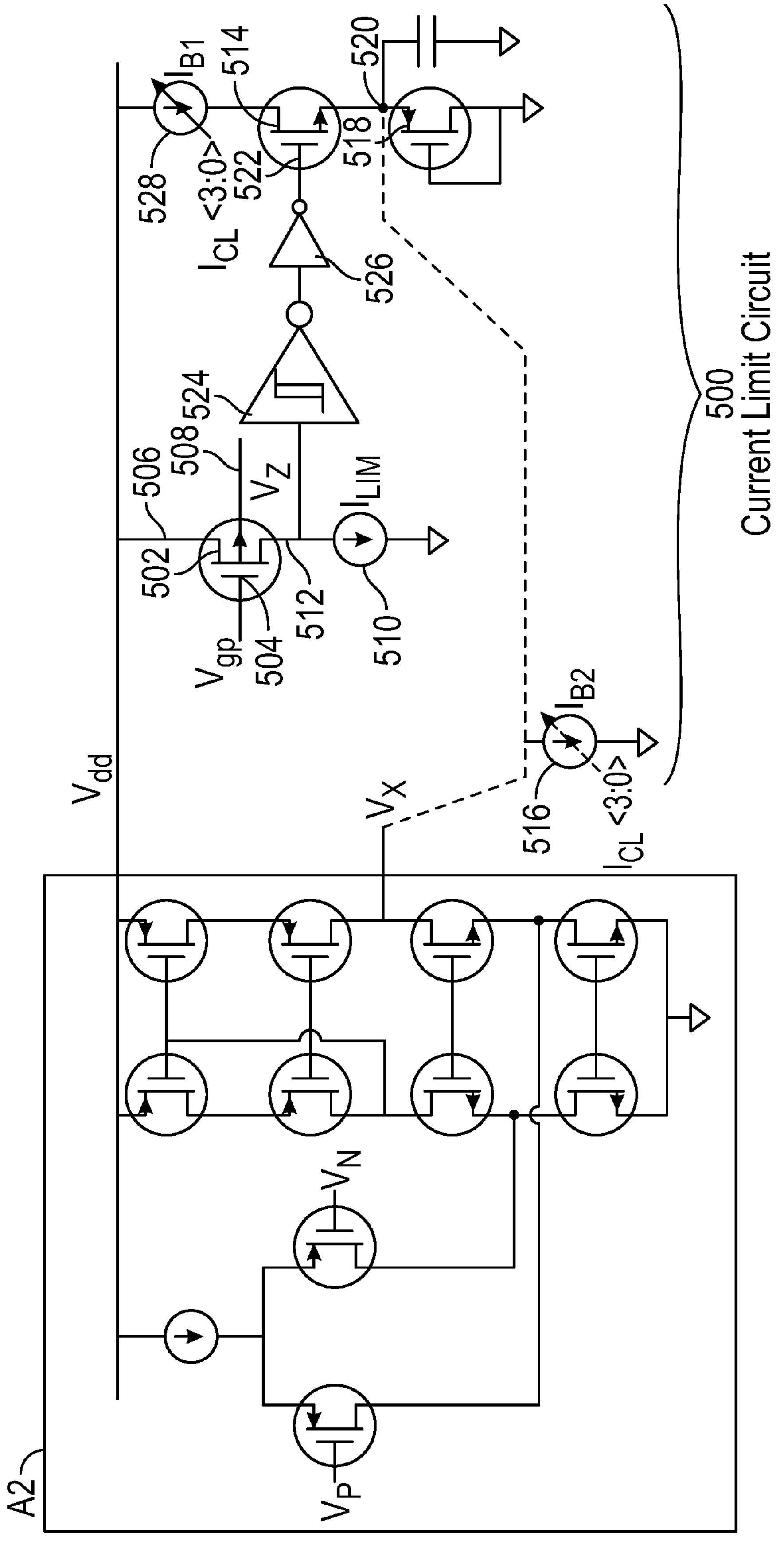
FIG. 5 depicts an example of a current limit and clamp circuit, in accordance with this disclosure.

FIG. 5 depicts an example of a current limit and clamp circuit, in accordance with this disclosure. Typically, if the output transistor 102 of FIG. 2 is too large in size due to high load current requirements and/or low dropout voltage requirements, it can cause issues during power-up. In such a scenario, the output capacitor is fully discharged and the main loop acts in a way to bring down the gate of the output transistor 102 close to ground. This causes a large in-rush current that varies over process and temperature, which can damage the power routings.

The same thing can happen if there is a short-to-ground fault with the circuit to which this LDO is supplying power. In such a case, the main loop would again regulate the gate of the output transistor 102 to close to ground rail and cause a large current to flow, which can lead to electromigration or other reliability issues.

The left-hand side of FIG. 5 depicts the amplifier circuit A2 of FIG. 3, e.g., a folded cascode configuration, which generates the control terminal voltage Vx. The voltage VP is the voltage between the resistors 310, 312 in FIG. 2 and the voltage VN is V1 of FIG. 2.

The right-hand side of FIG. 5 depicts a current limiting circuit 500 configured to clamp the control terminal voltage Vx generated by the amplifier circuit A2 to a specified voltage, e.g., a DC voltage, when the current flowing through the output transistor 102 of FIG. 2 exceeds a specified current, such as a current limit.

The current limiting circuit 500 includes a transistor 502 that is a scaled replica of the output transistor 102 of FIG. 2, where respective voltages at a control terminal 504, e.g., gate terminal, a first terminal 506, e.g., source terminal, and a second terminal 508, e.g., bulk terminal, of the transistor 502 correspond to voltages of the control terminal, the first terminal, and the second terminal of the output transistor 102, respectively. The current through a third terminal 512, e.g., drain terminal, in this mirrored device desirably matches the load current flowing in the output transistor 102. The voltage $V_{GP}$ at the control terminal 504 of the transistor 502 is the same voltage as that at the control terminal of the output transistor 102 of FIG. 2.

A first current source 510 coupled to the third terminal 512, e.g., drain terminal, of the transistor 502 is configured to source or sink the specified current ILIM. The current limiting circuit 500 is configured such that when the current flowing through the output transistor 102 of FIG. 2 exceeds the specified current, a transistor 514 is turned on to couple a second current source 516 to a diode-connected transistor 518 to generate the specified voltage, e.g., DC voltage, at node 520.

The second current source 516 generates a current IB2 that is different than the current ILIM of the first current source 510, which can allow the current limiting circuit 500 to detect a higher load current and limit the current to a much lower value. The second current source 516 is used during normal operation if there is leakage current through the transistor 514. The second current source 516 does not load the output of the amplifier circuit A2. Whatever current is output by the amplifier circuit A2 is sunk by the second current source 516.

If the current $I_{LIM}$ of the first current source 510 is set to be more than the maximum load current $I_L$, then during normal operation the Vz node will be almost zero volts. This means that the control terminal 522, e.g., gate terminal, of the transistor 514 in the chain after the Schmitt-trigger 524 and inverter 526 would also be at zero volts. In the event of a current limit situation, the load current in the output transistor 102 goes beyond $k{*}I_{LIM}$, where k is the scaling factor between the transistor 502 and the output transistor 102. The main loop attempts to bring down the voltage at the control terminal of the output transistor 102 closer to ground in order to sink the large current. Hence, at the point when the current sourced by the transistor 502 becomes more than the bottom current sink of the first current source 510, the control terminal 522 of the transistor 514 is pulled high and the node Vx will not be allowed to fall below the voltage shown below in Equation (6):

$$V_{gs\_MPRZ} = \sqrt{\frac{2I_{B1}}{\mu_p C_{OX}\frac{W_{MPRZ}}{L_{MPRZ}}}} + |V_{Thp}| \tag{6}$$

Thus, the circuit determined current limit is shown in Equation (7):

$$I_{L\_CL} = k\frac{1}{2}\mu_p C_{OX}\frac{W_{MP}}{L_{MP}}(V_{gs\_MPRZ} - |V_{Thp}|)^2 = kI_{B1}\frac{W_{MP}}{W_{MPRZ}}\frac{L_{MPRZ}}{L_{MP}} \tag{7}$$

Typically, both the transistor 502 and the transistor 514 are chosen as minimum length devices and the current source 528 with current IB1 is trimmable.

The voltage at the control terminal 522 of the transistor 514 contains information about whether the current flowing through the output transistor 102 has exceeded the current limit. The voltage at the control terminal 522 of the transistor 514 switches from low voltage to close to the supply voltage VDD, which turns on the transistor 514. This allows the trimmable drain current IB1 of the current source 528 to flow into the diode-connected transistor 518, which clamps the output of the amplifier circuit A2 to a DC voltage.

Figure 6:
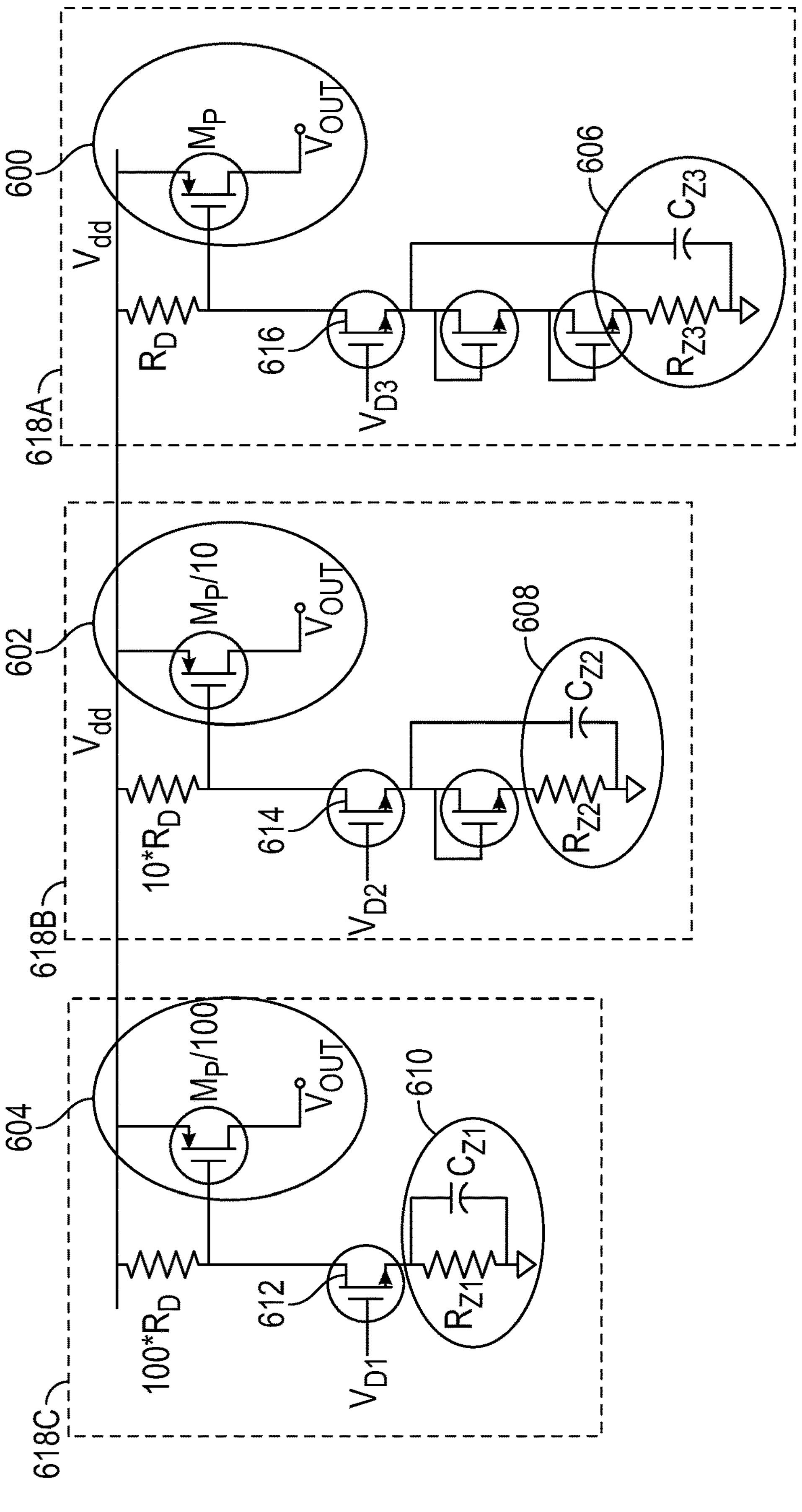
FIG. 6 is an example of gate driver slices of the output transistor of FIG. 2.

FIG. 6 is an example of gate driver slices of the output transistor of FIG. 2. The output transistor 102 of FIG. 2 can include a plurality of transistors, where the plurality of transistors includes at least a first group of transistors 600 and a second group of transistors 602. In some examples, the plurality of transistors can further includes a third group of transistor 604, and in some cases, more than three groups of transistors. At least one of the first group of transistors 600 and the second group of first transistors 602 is selectively turned ON based on a load current at the output node 104 of FIG. 2 of the LDO 200.

In FIG. 6, an individual one of the first group of transistors 600 and the second group of transistors 602 is associated with a first resistor and capacitor network 606 and a second resistor and capacitor network 608, respectively. Each of the first resistor and capacitor network 606 and the second resistor and capacitor network 608 is based on the load current at the output node 104 of FIG. 2 of the LDO 200. If present, the third group of transistors 604 is associated with a third resistor and capacitor network 610. Each of the first resistor and capacitor network 606 and the second resistor and capacitor network 608 (and any other resistor and capacitor networks, if present) provide a corresponding zero for compensating a pole that varies in frequency, as described below. The gate driver slices are shown in FIG. 6 at 618A-618C. The gate driver slices are activated as the load current is swept from a minimum to a maximum.

The third resistor and capacitor network 610 in the left-most gate drive slice 618C generates a zero. When the LDO moves to a high load current and all the devices are switched on, sufficient for left and middle slices to go into triode but not enough such that the right-most slide 618A goes into triode, the zero moves. The zero moves depending on which slices 618A-618C are activated. As the number of activated slices 618A-618C changes, the frequency response changes.

As described below, the loop with the error amplifier 108 has a slow response and is not able to accommodate a fast change in load current. By using the techniques of FIG. 7, the load current can be copied and sent through a stack of diode connected FETs to accommodate a fast transition that does not depend on the loop delay.

In many use cases, the LDO is internal pole dominant, which is generally at the output of the error amplifier 108 or in a cascode node of the error amplifier 108. This can make the PSRR compensation challenging, especially if the output capacitor and/or the load current varies significantly. At high load current $I_L$ and low output voltage $V_{DO}$, the output pole moves inward, and moves outward in low load current $I_L$ and high output voltage $V_{DO}$. In addition, the dc value of loop gain also degrades with increasing load current $I_L$ and decreasing output voltage $V_{DO}$.

Using the techniques of FIG. 6, the output of the error amplifier 108 of FIG. 2 can drive the control terminals of the n-type FETs 612, 614, and 616 with voltages $V_{D1}$, $V_{D2}$, $V_{D3}$, etc. The previously discussed PSRR-compensation path and current limit path described above are not depicted here, for brevity. The structures shown in FIG. 6 would be present after the summing circuit 206 in FIG. 6, for example.

Consider the case when the load current $I_L$ drawn from the LDO 200 of FIG. 2 is low. In such a case, the split output FET marked as $$\frac{M_P}{100}$$

in the group of transistors 604 would be the one to primarily source the load current as the error amplifier 108 output driving the different $V_{Di}$ voltages would be able to turn on the driver slice marked $V_{D1}$ only. The groups of transistors 600, 602, due to their source degeneration, would operate in a cut-off region and hence no current would be flowing through the driver arms associated with the group of transistors 600 and the groups of transistors 602. This means for load current $I_L \in \{0\text{ mA}:1{:}5\text{ mA}\}$, the maximum quiescent current drawn by the LDO is given by Equation (8):

$$I_Q = \frac{V_{SG\_mp100}(I_L)}{100 * R_D} \tag{8}$$

The benefit is quite evident from the fact that if a single driver is used, the numerator would have gone down by a factor of $$\frac{1}{\sqrt{100}}$$

but the denominator would also have scaled down by $$\frac{1}{100}.$$

The gain of this stage is approximately given by Equation (9):

$$A_{v\_driver} = -\frac{g_m * 100R_D}{1 + g_m R_{Z1}} \frac{1 + sR_{Z1}C_{Z1}}{1 + \frac{sR_{Z1}C_{Z1}}{1 + g_m R_{Z1}}} \tag{9}$$

where $g_m$ is that of the n-type FET 612. At light loads, the previously encountered problems of high loop gain and lower output pole is now solved by making the loop gain lower $$\longrightarrow \frac{-100 * R_D}{R_{Z1}}$$

instead of $-g_m R_D$. The problem of the output pole moving in close to UGB is somewhat helped by placing the zero at the frequency given by Equation (10):

$$\omega_{z\_driver} = -\frac{1}{R_{Z1}C_{Z1}} \tag{10}$$

although a high-frequency pole is introduced at the frequency given by Equation (11):

$$\omega_{p\_driver} = -\frac{1 + g_m R_{Z1}}{R_{Z1}C_{Z1}} \tag{11}$$

When the load-current is higher, such as $I_L \in \{1{:}5\text{ mA}:15\text{ mA}\}$, the maximum quiescent current drawn by the LDO is given by Equation (12):

$$I_Q = \frac{V_{SG\_mp10}(I_L)}{10 * R_D} \tag{12}$$

Here, too, the benefits of using a $$\frac{1}{10}$$

sized output device as opposed to a full-sized device follows the above analysis. One thing to note is that in this load current interval, the n-type FET 612 of the first driver slice $$\frac{M_P}{100}$$

is basically in its deep triode region. The drain current would be given by Equation (13):

$$I_{L\_MP100} = k\frac{1}{2}\mu_p C_{OX}\frac{W_{MP}}{100L_{MP}}\left(\frac{R_{Z1}}{R_{Z1}+100R_D}V_{dd}-|V_{Thp}|\right)^2 \quad (13)$$

The designer can tune these parameters so that $I_{L\_MP100}$ falls around the desired current split mentioned earlier. The same holds for transfer of control from $$\frac{M_P}{10}$$

to $M_P$. The critical parameters of a loop gain stability like $A_{OL\_DC}$, $\omega_{p\_out}$ and $\omega_z$ variations across PVT, using the approximate calculations above show that there will still be variations within each of the gate driver slices but the overall variations will now be lower as control switches from one slice to the next with increase in load current $I_L$ and/or decrease in $V_{dropout}$.

Figure 7:
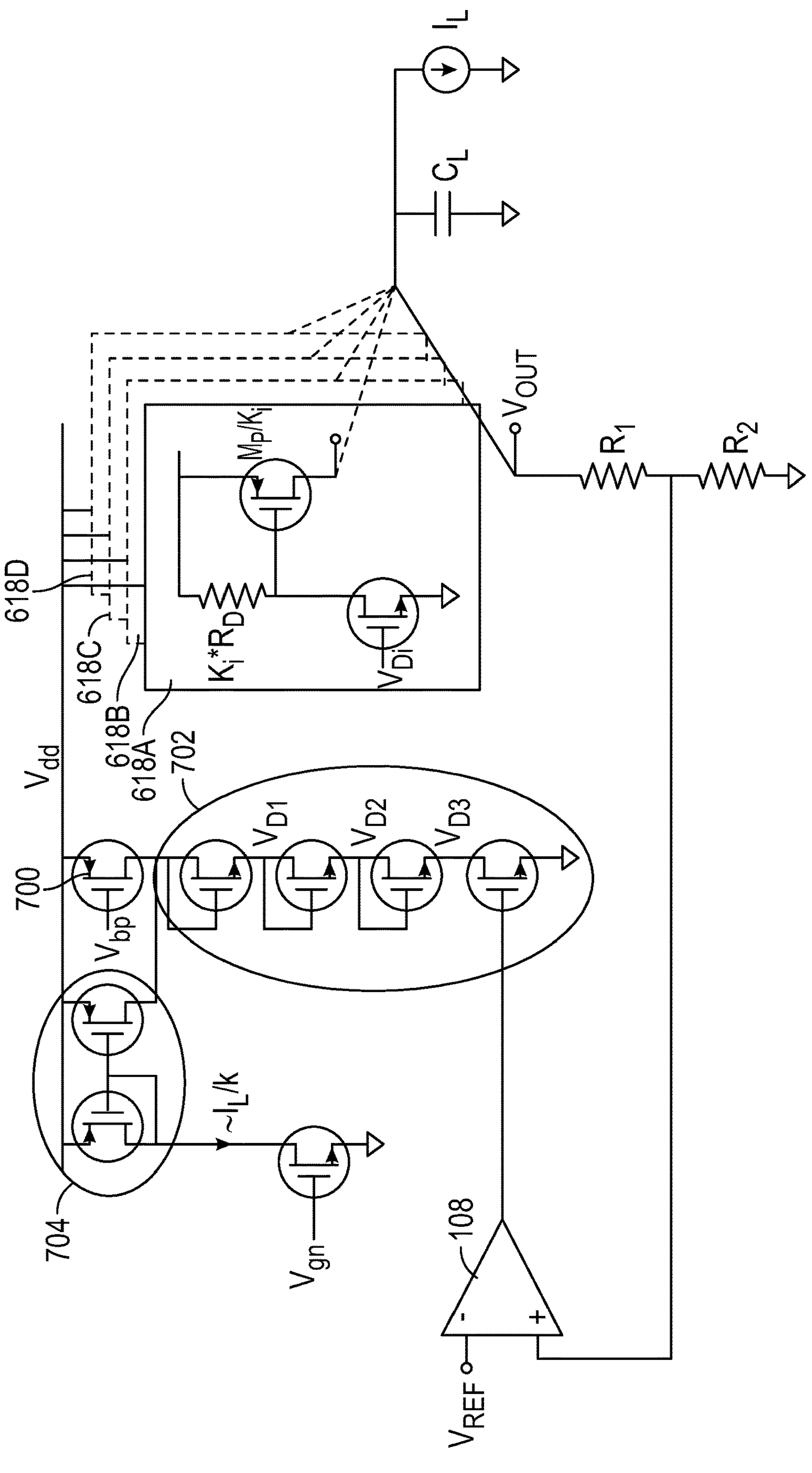
FIG. 7 depicts the gate driver slices of FIG. 6 and the error amplifier of FIG. 2.

FIG. 7 depicts the gate driver slices of FIG. 6 and the error amplifier of FIG. 2. The error amplifier 108 of FIG. 2 is shown on the left-hand side. The output of the error amplifier 108 is coupled to a current source 700, which generates the various $V_{Di}$ voltages used in FIG. 6. The gate driver slices 618A-618D are depicted on the right-hand side.

The error amplifier 108 can include an input stage that converts a differential signal to a single-ended signal. This stage drives the n-type FET input common-source stage 702 whose load is a fixed current source 700 and a scaled component of the actual load current $I_L$. This is done by using the voltage $V_{gn}$ generated in FIG. 3 and mirrored through a current mirror 704. The output of the common-source stage 702 includes the different $V_{Di}$ voltages that are used to drive the different scaled gate driver slices 618A-618D.

The voltage $V_{D1}$ that drives the gate of weakest driver slice is the highest amongst all other $V_{Di}$ voltages in dc terms. This is intentionally chosen such that when the output load current demanded from the LDO increases, the output of the first stage decreases and all the $V_{Di}$ voltages increase but with slightly different gains. When drawing very little current, voltages $V_{D2}$ and $V_{D3}$ are very low ($V_{D1}$ is highest in the chain of diode-connected FETs). The voltage $V_{D2}$ is one threshold voltage below and voltage $V_{D3}$ is two threshold voltages below the voltage $V_{D1}$. As output of the error amplifier 108 decreases, the voltage $V_{D2}$ increases and becomes more than two threshold voltages.

In any case, the voltage $V_{D1}$ will become very high (close to the supply voltage) and the corresponding weakest driver slice will go into its deep triode region. All this occurs while the input to the strongest driver slice $V_{D3}$ is not high enough to turn on the corresponding driver slice and this portion of the output transistor 102 remains in cut-off hence improving overall efficiency given by Equation (14):

$$\eta_{LDO} = \frac{I_L}{I_L + I_Q} \quad (14)$$

In some examples, a scaled load current $I_L$ can be used in addition to a fixed current source as load of the second stage.

Figure 8:
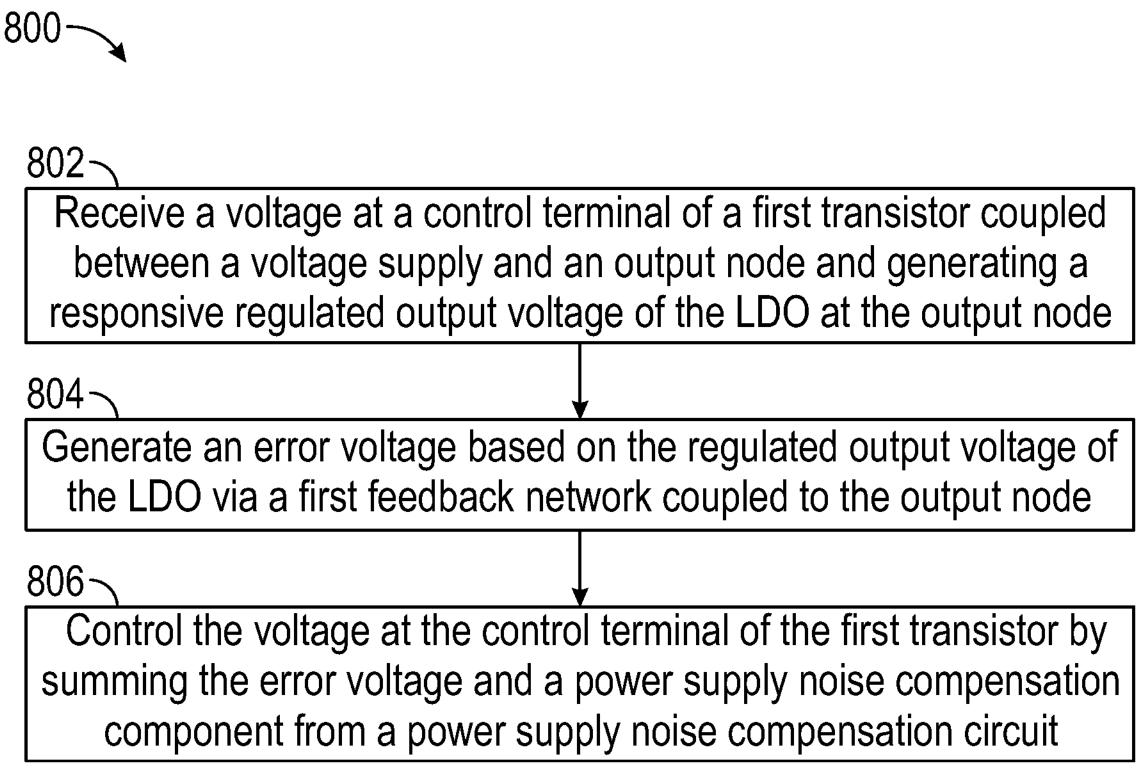
FIG. 8 is a flow diagram of an example of a method 800 of performing power supply noise compensation in a low dropout voltage regulator (LDO), in accordance with this disclosure.

FIG. 8 is a flow diagram of an example of a method 800 of performing power supply noise compensation in a low dropout voltage regulator (LDO), in accordance with this disclosure. At block 802, the method 800 includes receiving a voltage at a control terminal of a first transistor coupled between a voltage supply and an output node and generating a responsive regulated output voltage of the LDO at the output node. At block 804, the method 800 includes generating an error voltage based on the regulated output voltage of the LDO via a first feedback network coupled to the output node. At block 806, the method 800 includes controlling the voltage at the control terminal of the first transistor by summing the error voltage and a power supply noise compensation component from a power supply noise compensation circuit.

The method 800 can further include generating a scaled current through the first transistor upon which a bias current of a second transistor is based.

The method 800 can further include buffering the summed error voltage and the power supply noise compensation component.

The method 800 can further include performing current limiting by clamping a first control terminal voltage Vx to a specified voltage, e.g., DC voltage, when the current flowing through the first transistor exceeds a specified current.

The method 800 can further include coupling a current source to a diode-connected transistor to generate the specified voltage when the current flowing through the first transistor exceeds the specified current.

The method 800 can further include selectively turning ON at least one of a first group of first transistors and a second group of first transistors based on a load current at the output node of the LDO.

An individual one of the first group of first transistors and the second group of first transistors can be associated with a first resistor and capacitor network and a second resistor and capacitor network, respectively, and each of the first resistor and capacitor network and the second resistor and capacitor network can be based on the load current at the output node of the LDO. In such an example, the method 800 can include providing a corresponding zero for compensating a pole that varies in frequency.

Various Notes

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. A low dropout voltage regulator (LDO) with power supply noise compensation, the LDO comprising:

- a first transistor coupled between a voltage supply and an output node, the first transistor having a control terminal;
- a first feedback network coupled to the output node and configured to generate an error voltage based on a regulated output voltage of the LDO;
- a first amplifier circuit including a first input for receiving a reference voltage and a second input for receiving the error voltage; and
- a power supply noise compensation circuit coupled between the voltage supply and the control terminal of the first transistor, wherein the power supply noise compensation circuit includes:

- a second transistor that is a scaled replica of the first transistor, wherein respective voltages at a control terminal, a first terminal, and a second terminal of the second transistor correspond to voltages of the control terminal, a first terminal, and a second terminal of the first transistor, respectively;
- a third transistor coupled in series with the second transistor to bias the second transistor with a scaled current through the first transistor;
- a second amplifier circuit configured to include a second feedback network that includes the second transistor, the second feedback network generating a power supply noise offset voltage at a third terminal of the second transistor and a corresponding first control terminal voltage at the control terminal of the second transistor; and
- a summing circuit to sum an output voltage of the first amplifier circuit with the first control terminal voltage at the control terminal of the second transistor for application to the control terminal of the first transistor for power supply noise compensation of the regulated output voltage.

2. The LDO of claim 1, comprising:

a biasing network including a third amplifier circuit and a fourth transistor, wherein the fourth transistor is a scaled replica of the first transistor, wherein respective voltages at a control terminal, a first terminal, and a second terminal of the fourth transistor correspond to voltages of the control terminal, the first terminal, and the second terminal of the first transistor, respectively, wherein the biasing network is configured to generate the scaled current through the first transistor upon which a bias current of the second transistor is based.

3. The LDO of claim 1, wherein the summing circuit comprises:

a pair of transistors, wherein a first one of the pair of transistors is configured to receive the output voltage of the first amplifier circuit and second one of the pair of transistors is configured to receive the first control terminal voltage, wherein the pair of transistors is configured to produce a sum of the output voltage of the first amplifier circuit and the first control terminal voltage.

4. The LDO of claim 3, comprising:

a buffer circuit coupled between the summing circuit and the control terminal of the first transistor.

5. The LDO of claim 1, comprising:

a current limiting circuit configured to clamp the first control terminal voltage generated by the second amplifier circuit to a specified voltage when the current flowing through the first transistor exceeds a specified current.

6. The LDO of claim 5, wherein the current limiting circuit comprises:

a sixth transistor that is a scaled replica of the first transistor, wherein respective voltages at a control terminal, a first terminal, and a second terminal of the sixth transistor correspond to voltages of the control terminal, the first terminal, and the second terminal of the first transistor, respectively; and a first current source sourcing or sinking the specified current, the first current source coupled to a third terminal of the sixth transistor, wherein the current limiting circuit is configured such that when the current flowing through the first transistor exceeds the specified current, a seventh transistor is turned on to couple a second current source to a diode-connected eighth transistor to generate the specified voltage.

7. A method of performing power supply noise compensation in a low dropout voltage regulator (LDO), the method comprising:

receiving a voltage at a control terminal of a first transistor coupled between a voltage supply and an output node and generating a responsive regulated output voltage of the LDO at the output node;

generating an error voltage based on the regulated output voltage of the LDO via a first feedback network coupled to the output node;

biasing a second transistor with a scaled current through the first transistor via a third transistor coupled in series with the second transistor, wherein the second transistor is a scaled replica of the first transistor, and wherein respective voltages at a control terminal, a first terminal, and a second terminal of the second transistor correspond to voltages of the control terminal, a first terminal, and a second terminal of the first transistor, respectively;

generating, via a second amplifier circuit configured to include a second feedback network that includes the second transistor, a power supply noise offset voltage at a third terminal of the second transistor and a corresponding first control terminal voltage at the control terminal of the second transistor; and controlling the voltage at the control terminal of the first transistor by summing the error voltage and the first control terminal voltage for application to the control terminal of the first transistor for power supply noise compensation of the regulated output voltage.

8. The method of claim 7, comprising:

buffering the summed error voltage and the first control terminal voltage.

9. The method of claim 7, comprising:

performing current limiting by clamping the first control terminal voltage to a specified voltage when the current flowing through the first transistor exceeds a specified current.

10. The method of claim 9, comprising:

coupling a current source to a diode-connected transistor to generate the specified voltage when the current flowing through the first transistor exceeds the specified current.

11. A method of performing power supply noise compensation in a low dropout voltage regulator (LDO), the method comprising:

receiving a voltage at a control terminal of a first transistor coupled between a voltage supply and an output node and generating a responsive regulated output voltage of the LDO at the output node;

generating an error voltage based on the regulated output voltage of the LDO via a first feedback network coupled to the output node;

controlling the voltage at the control terminal of the first transistor by summing the error voltage and a power supply noise compensation component from a power supply noise compensation circuit; and when current flowing through the first transistor exceeds a specified current, performing current limiting by coupling a current source to a diode-connected transistor to generate a specified voltage and clamping a first control terminal voltage to the specified voltage.

* * * * *